United States Patent
Asaria et al.

(10) Patent No.: US 11,127,186 B2
(45) Date of Patent: Sep. 21, 2021

(54) SYSTEMS AND METHODS FOR TRANSMITTING AND RENDERING 3D VISUALIZATIONS OVER A NETWORK

(71) Applicant: Well.ca Inc., Guelph (CA)

(72) Inventors: Ali Asaria, Guelph (CA); Nedim Kahvo, Kitchener (CA)

(73) Assignee: TULIP.IO INC., Kitchener (CA)

( * ) Notice: Subject to any disclaimer, the term of this patent is extended or adjusted under 35 U.S.C. 154(b) by 0 days.

(21) Appl. No.: 13/827,545

(22) Filed: Mar. 14, 2013

(65) Prior Publication Data

US 2013/0241926 A1 Sep. 19, 2013

Related U.S. Application Data

(60) Provisional application No. 61/610,743, filed on Mar. 14, 2012.

(51) Int. Cl.
*G06T 15/00* (2011.01)
*G06Q 30/00* (2012.01)
*G06Q 10/00* (2012.01)

(52) U.S. Cl.
CPC ........... *G06T 15/005* (2013.01); *G06Q 10/00* (2013.01); *G06Q 30/00* (2013.01)

(58) Field of Classification Search
CPC ......... G06T 19/00; G06T 17/20; G06T 17/00; G06T 15/10; G06T 15/00
USPC .................................. 345/419; 709/203, 219
See application file for complete search history.

(56) References Cited

U.S. PATENT DOCUMENTS

| | | | |
|---|---|---|---|
| 7,283,139 B1* | 10/2007 | Tanaka | 345/581 |
| 7,751,928 B1 | 7/2010 | Antony et al. | |
| 8,423,431 B1 | 4/2013 | Rouaix et al. | |
| 8,456,467 B1* | 6/2013 | Hickman et al. | 345/419 |
| 2005/0238465 A1 | 10/2005 | Razumov | |
| 2006/0001596 A1* | 1/2006 | Cuffaro | 345/32 |
| 2006/0037053 A1* | 2/2006 | McDowell et al. | 725/80 |
| 2006/0293810 A1 | 12/2006 | Nakamoto | |
| 2009/0138544 A1* | 5/2009 | Wegenkittl et al. | 709/203 |
| 2010/0199160 A1* | 8/2010 | Klassen | G06F 16/9577 715/210 |
| 2010/0199169 A1* | 8/2010 | Gnech et al. | 715/234 |
| 2011/0078120 A1* | 3/2011 | Tyhurst et al. | 707/654 |
| 2011/0218825 A1* | 9/2011 | Hertenstein | 705/4 |

(Continued)

*Primary Examiner* — Todd Buttram
(74) *Attorney, Agent, or Firm* — BERESKIN & PARR LLP/S.E.N.C.R.L., s.r.l.

(57) ABSTRACT

According to some embodiments, a system for transmitting and rendering a visualization of at least one object is described herein. The system includes a web server having access to at least one web page that includes three-dimensional embedding ("3D embedding") instructions for requesting at least one 3D visualization associated with an object; a client computer in the data communication with the at least one web server, the client computer configured to receive the at least one web page and execute the 3D-embedding instructions included therein to send a request for the visualization associated with the object; and a visualization server in data communication with the client computer configured to determine whether the visualization is available, and determine whether the client computer is operable to render the 3D visualization, and determine whether to provide the 3D visualization data to the client computer.

18 Claims, 6 Drawing Sheets

(56) References Cited

U.S. PATENT DOCUMENTS

| | | |
|---|---|---|
| 2012/0032783 A1* | 2/2012 | Ahn et al. .................... 340/6.1 |
| 2012/0330458 A1 | 12/2012 | Weiss |
| 2013/0132466 A1* | 5/2013 | Miller et al. ................. 709/203 |
| 2013/0155206 A1* | 6/2013 | Lazarski ............ H04N 13/0029 |
| | | 348/51 |

* cited by examiner

SYSTEMS AND METHODS FOR TRANSMITTING AND RENDERING 3D VISUALIZATIONS OVER A NETWORK

RELATED APPLICATIONS

This application claims benefit of the U.S. Provisional Application No. 61/610,743, entitled Systems and Methods for Transmitting and Rendering 3D Visualizations over a Network, filed on 14 Mar. 2012.

TECHNICAL FIELD

The embodiments described herein relate to systems and methods for transmitting and rendering visualizations of objects, in particular to transmitting and rendering visualization of objects over a network such as communications network (e.g. the internet).

INTRODUCTION

Websites are generally used to provide information about various objects over the internet, for example in electronic commerce (e.g. e-commerce) applications. Some websites may have a visualization of the object, such as an image, to help a user better understand the object. However, images of objects may not provide a complete view of the object, as they may only provide a two dimensional view, particularly from a limited number of angles.

While many websites upload multiple images to try to capture the object from various vintage points, in many cases, users may want to view the object from angles that are not captured, or get a better sense of the overall form of the object.

In an e-commerce example, merchants sell goods over a communications network, such as the Internet. For example, major retailers may sell electronic devices such as music players, GPS navigation units and smartphones. The retailers often include a number of images of the objects, often from different angles. However, despite these images, many potential customers may decide not to buy the products as until they can more closely examine the products in a traditional in a brick and motor store. For example, customers may not be able to get a sense of the ergonomics or overall form of a product from mere examination of the two-dimensional ("2D") images.

BRIEF DESCRIPTION OF THE DRAWINGS

Some embodiments will now be described, by way of example only, with reference to the following drawings, in which.

DESCRIPTION OF SOME EMBODIMENTS

Figure 1:
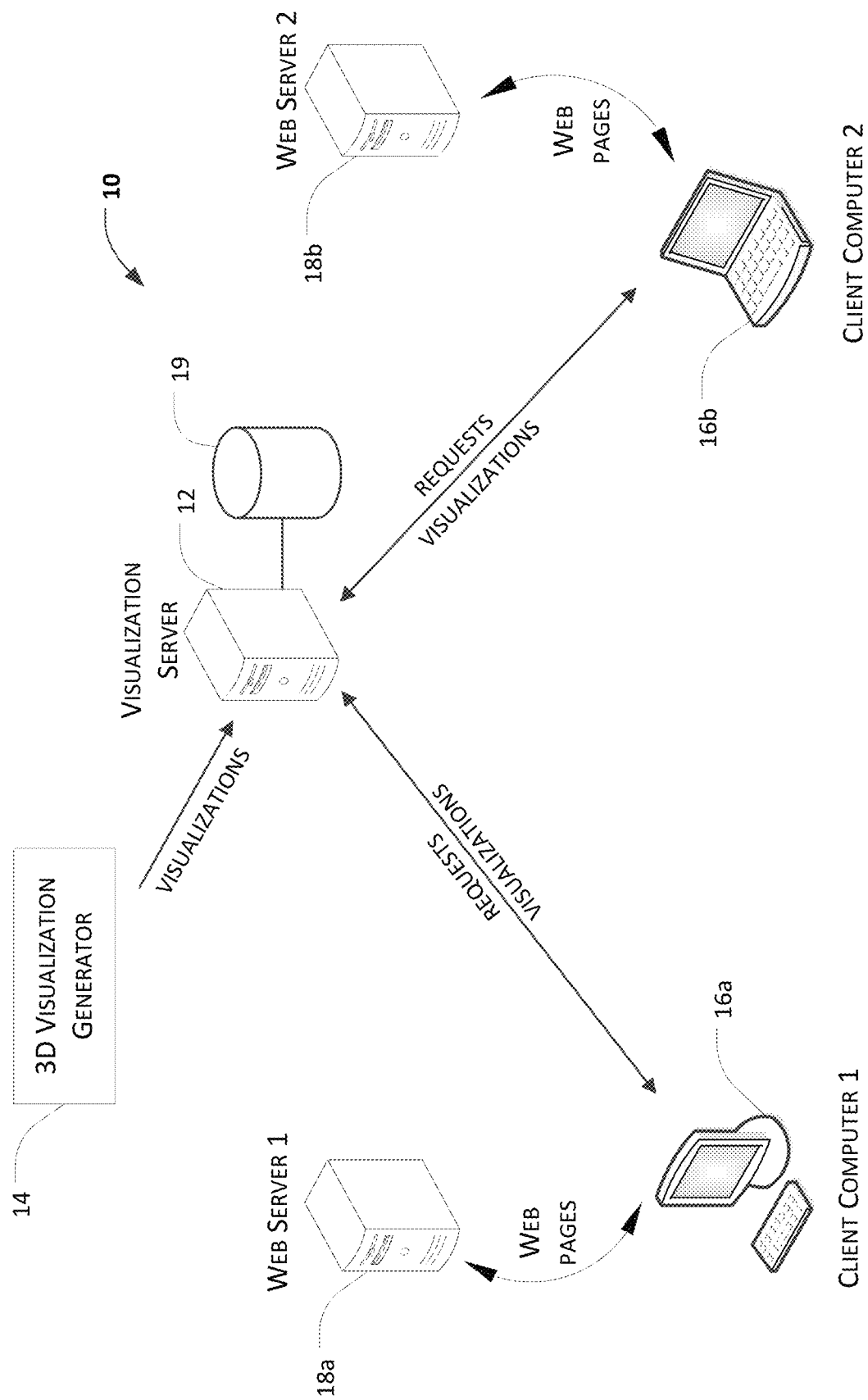
FIG. 1 is a schematic diagram illustrating a system for transmitting and rendering a visualization of at least one object over a network.

For simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art that the embodiments described herein may be practiced without these specific details. In other instances, well-known methods, procedures and components have not been described in detail so as not to obscure the embodiments generally described herein.

Furthermore, this description is not to be considered as limiting the scope of the embodiments described herein in any way, but rather as merely describing the implementation of various embodiments.

In some cases, the embodiments of the systems and methods described herein may be implemented in hardware or software, or a combination of both. In some cases, embodiments may be implemented in one or more computer programs executing on one or more programmable computing devices comprising at least one processor, a data storage device (including in some cases volatile and non-volatile memory and/or data storage elements), at least one input device, and at least one output device.

In some embodiments, each program may be implemented in a high level procedural or object oriented programming and/or scripting language to communicate with a computer system. However, the programs can be implemented in assembly or machine language, if desired. In any case, the language may be a compiled or interpreted language.

In some embodiments, the systems and methods as described herein may also be implemented as a non-transitory computer-readable storage medium configured with a computer program, wherein the storage medium so configured causes a computer to operate in a specific and predefined manner to perform at least some of the functions as described herein.

As noted above, images of objects in existing websites may not provide complete visualization of objects from desired angles. At least some of the embodiments described herein attempt to transmit and render three-dimensional visualizations of various objects at client computers.

When the 3D visualizations are successfully rendered by the client computers, the users may interact with the visualizations to manipulate the visualizations to view the object from different viewpoints. The users may also "zoom-in" on the rendered visualization to observe parts of interest in detail or "zoom-out" to obtain a more distant vantage point. Being able to manipulate the visualization and observe the visualization of the object from desired perspectives may provide a superior user experience when compared to merely viewing 2D images.

One challenge of providing 3D visualizations is obtaining 3D visualization data for various objects. In comparison to obtaining 2D images of objects, which can be captured using commonly available imaging devices (e.g. digital cameras), obtaining 3D visualizations may be more difficult and time consuming. In particular, many merchants or websites may not have the necessary hardware or other resources required to obtain and/or generate 3D visualization data of various objects.

Another challenge of providing 3D visualizations to users is the ability of the client computers to successfully render the 3D visualization based upon the 3D visualization data provided. In particular, in many instances, the client computer may not be able to render the 3D visualization based upon the 3D visualization data provided for a variety of reasons such as, for example due to performance limitations, improper configurations, and so on. This may result in an error being displayed on the webpage on the client computer, which is generally undesirable as it affects the user experience with the webpage and can indirectly leave the user with a negative impression about the product, the seller of the product (or both).

In some cases, the inability of the client computer to render the 3D visualizations may stem from hardware limitations. For example, the graphics processor on the client computer may not have sufficient computing power or be able to perform one or more graphic processing functions to properly render the image (which could be a software limitation, a hardware limitation, or both). In particular, the inability to render the 3D visualizations may be caused by software limitations. For example, a browser application on the client computer may not have the ability to render the 3D visualization (e.g. no suitable plug-in installed) or the firmware/driver for the graphics processor may not be able to support certain graphic processing functions.

In another example, the drivers for the graphics processor may not be updated or installed properly. Regardless of the source of the inability, it is generally desirable to detect the ability of the client computer to render the 3D visualizations (either successfully or unsuccessfully) so that potential error messages stemming from the inability to render the visualizations may be avoided or mitigated.

It is also generally desirable to determine the ability of the client computers to render the 3D visualization prior to transmitting the data associated with the visualization. Having this information may allow the client computer and the server to avoid requesting and transmitting the 3D visualization data (which may be relatively large) to a client computer that is unable to render such data. This may also avoid unnecessary delay associated with obtaining the data associated with the visualization.

Referring now to FIG. 1, illustrated therein is a system 10 for locating application-specific data according to some embodiments. The system 10 includes a visualization data source 14 in data communication with a visualization server 12. The server 12 is in data communication with various client computers 16 which may be over a network such as the Internet. Each of the visualization server 12, visualization data source 14 and client computers 16 may contain one or more processors (hardware processing units) configured to operate as described hereinbelow.

The visualization data source 14 generates 3D visualization data associated for various objects and makes that 3D visualization data available to the visualization server 12. In some cases. The visualization data source 14 may store the visualization data in a data storage device such as a database 19 that is accessible by the visualization server 12. In some cases, the visualization data source 14 may provide the visualization data to the visualization server 12 for storage.

The visualization data source 14 may use various suitable software and/or hardware devices to generate the 3D visualization data. For example, the visualization data source 14 may use a 3D scanner such as a scanner marketed by NextEngine Inc. or one marketed by 4DDyanmics (PicoScan). In some cases, a custom scanner may be used to generate 3D visualization data. The custom scanner, for example, may potentially include various combinations of a rotating support, scanning lasers, 3D light field, and other suitable hardware. Another way to scan may be through the use of photogrammetry where many 2D images taken from various angles are stitched together to form a 3D image.

The 3D scanner scanning an object typically generates a 3D visualization data file that includes 3D visualization data associated with a 3D visualization of the object. The 3D visualization data, for example, may include shape data about the shape of the object as a mesh, set of points in 3D space and/or other suitable description of three dimensional data. The scanner may also generate a texture map or an image data that is associated with the shape data. When rendering the object, the texture map or shape data is projected to the associated shape data (e.g. the mesh and/or 3D set of points) to generate the 3D visualization.

In some embodiments, the 3D visualization data file may be stored in a suitable format that is suitable for representing 3D visualization data and readily transmittable over a network such as the Internet. For example, the 3D visualization data file may be in a format that is compliant with Open Graphics Library ("OpenGL") specification. Other suitable formats for the 3D visualization data file may include one or more of Binary, Collada DAE, JSON, 3D Studio, and Wavefront OBJ formats.

In some embodiments, the output from the 3D scanner (e.g. 3D visualization data) may be processed prior to providing the data to the visualization server 12. Processing the output from the 3D scanner may be useful since 3D scanners may have extraneous points, missing data ("holes") and/or noise. In such cases, processing the captured 3D visualization data may help remove duplicate and/or unreferenced vertices, non-manifold edges, vertices and null faces, and so on. A simplification process based on quadric error measure may be executed to reduce a 3D mesh of the object.

Furthermore, processing of the captured 3D visualization data may reduce the file size, in some cases without materially impacting the quality of the rendering of the visualization data. For example, the 3D visualization data may be processed to reduce its complexity, which in turn may reduce the size of the data. In another example, the data may be processed to clean the output, removing extraneous data and so on.

In some embodiments, several versions of the 3D shape data may be created at scan time or after the captured 3D visualization data is processed (or both) in order to provide different sizes of 3D shape data. Generally, the size (i.e. the resolution) of the 3D visualization affects a file size associated with the 3D visualization. Having 3D visualization of different sizes allows provision of the smaller size 3D visualization and corresponding smaller sized file initially. A larger 3D visualization may then be provided subsequently (e.g. when the user zooms into the image). This may allow the 3D visualization to load faster, as the smaller size file is provided first, which may improve user experience.

In some embodiments, the captured 3D visualization data may be dissected and saved as different portions. For example, the 3D visualization data may be divided up such that an anterior portion of the model is saved in a file that is different from the rear portion. This permits provisioning of the data in parts which may allow rendering of a portion of the 3D rendering to execute faster. For example, the front-facing shape data may be loaded first, and the rear part of the model (only visible when the user rotates the model) is loaded after.

In another example, the data may be processed to modify the visualization, format or size of the output files. In another example, the output may be processed to reduce the number of points in the mesh without materially affecting the shape data. Processing of the 3D visualization data may be executed automatically without operator input and/or based upon operator input.

The visualization data source 14, in some embodiments, may also obtain 2D data associated with 2D visualizations (e.g. images) associated with the object. The 2D data may be obtained using a digital camera or other suitable imaging device.

In some cases, when 2D data and/or 3D visualization data for objects are available from other sources, the visualization data source 14 may obtain the appropriate 2D and 3D visualization data from those sources. That is, the visualization data source 14 need not generate the 2D data or the 3D visualization data if such 2D and 3D visualization data already exists. For example, a manufacturer, importer or another interested party may already have generated the associated visualization data (2D and/or 3D visualization data) for product planning or promotional purposes. In such cases, the visualization data source 14 may obtain such data from a suitable source.

In some embodiments the visualization data source 14 may associate the visualization data with an identifier associated with the object that the data represents. The identifier, for example, may be a unique identifier associated with the object. In some cases, the unique identifier associated with the visualization data may be an existing unique identifier in an industry. For example, the unique identifier may be a Universal Product Code ("UPC") if the object is a retail product.

In other examples, other suitable forms of existing unique identifiers for the object may be used. In some cases, where there are no existing identifiers, the visualization data source 14 may generate an identifier associated with the object. In some embodiments, another component of the system 10, in addition to or instead of the visualization data source 14, may associate the visualization data with an identifier.

After obtaining the visualization data associated with the object, the visualization data source 14 transmits or otherwise makes the visualization data available to the visualization server 12. In some cases, the visualization data may be transmitted to the visualization server 12 using a "POST" request method supported by Hyper Text Mark-up Language ("HTML") protocol. In other cases, any other suitable ways of transmitting the data may be utilized to provide the visualization data to the visualization server 12.

In some embodiments, the visualization data may be stored in a database and/or a file system that is accessible over a network. For example, the visualization data may be stored in a database and/or a file system that is compliant with Representational State Transfer ("REST") standard. The visualization data stored in such database and/or file system may be easily accessed over the Internet, for example via HTML protocol.

The visualization server 12 makes the visualization data associated with various objects available to various client computers 16 that are in data communication therewith as described herein below. For example, the visualization server 12 may transmit the visualization data to one or more client computers 16 upon request. In some embodiments, the visualization server 12 may also make the data available to one or more web servers 18.

The web servers 12 may provide web pages that include information about one or more objects. The web pages may be provided to facilitate various purposes. For example, the web pages may be used to facilitate buying and/or selling of products over the Internet. For example, a retailer may have a "virtual store" where customers receive information about and purchase various products.

In some cases, the web pages may be used to provide information about various goods. For example, many companies have websites where users may obtain information about the products that the companies provide and/or are working on. A car dealership, for example, may have website that provides a virtual showroom whereby prospective customers may browse various cars that are available for sale by the dealership.

Generally, each web server 18 makes images of the objects available to client computers 16. In some cases, one or more of the web servers 18 may host the images that are provided in the web page. In some cases, the data associated with the images are hosted by one or more servers other than the web servers 18. For example, in some cases, the images could be hosted by the visualization server 12.

The web pages provided would typically include address information of one or more servers hosting the image data and instructions in computer code to retrieve the image data from the appropriate servers. The browser applications on the client computers 16 will then execute the instructions to retrieve the image data from the servers at the addresses provided.

The web pages provided by the web servers 18 may include additional 3D-embedding instructions. The 3D-embedding instructions may be provided in addition to image data retrieval instructions noted above. The 3D-embedding instructions, when executed by the browser on the client computers 16, cause the browser application to send one or more requests for 3D visualization data (i.e. the data required to render the visualization of the object in 3D) from the visualization server 12. The request for 3D visualization data may include an identifier (e.g. a UPC, or other identifier) associated with the object for which the 3D visualization data is sought.

When a request for 3D visualization data for an object is received, the visualization server 12 may first determine whether it has access to 3D visualization data for the object. If the server 12 does not have 3D visualization data for the particular object, the server 12 may ignore the request or send a response indicating that no 3D visualization data is available for that request.

In some embodiments, the identifier of the object provided in the request may be logged so that 3D visualization data for the object may be generated at a later date.

In some embodiments, when the 3D visualization data is unavailable, a 2D image data for the object may be provided instead of the 3D visualization data. For example, the server 12 may have access to a 2D image data (but not the 3D visualization data) for the object. In such cases, the server 12 may send 2D image data in response to the request for 3D visualization data.

In some embodiments, when the 3D visualization data is unavailable, a notice indicating that 3D visualization data may be provided to the client computer to inform the user of the unavailability.

However, if the server 12 has access to 3D visualization data, the server 12 may provide such data. Generally, the visualization server 12 may be configured so that, before the requested 3D visualization data is provided to the client computers 16, the visualization server 12 executes one or more tests to determine whether the client computers 16 are able to successfully render the 3D visualization data. Testing the client computers 16 may reduce instances of 3D visualization data being transmitted to client computers 16 that are not capable of rendering the 3D visualization data.

Generally, the client computers 16 require appropriate hardware and software components to properly render 3D visualization data. For example, the client computers 16 may need to have appropriate updates or plugin software installed in the browser applications to render 3D visualizations. In some cases, the browser applications may support rendering of 3D visualization data even though the underlying hardware in the client computer may not be able to render 3D data. In these types of cases where the browser application supports rendering of the 3D data, the browser application may indicate in browser compatibility information that that the browser is able to render the 3D data that are given in certain 3D data file formats, even though the underlying hardware may not be able to do so. Various servers including the visualization server 12 may thus obtain the compatibility information to determine which of various formats are supported or not supported by the browser application. This compatibility information, in some cases, may also include information about the type of browser the client computer is running.

In some cases, the browser application may provide the compatibility information to the visualization server 12 without the server 12 needing to send a request for the compatibility information. For example, the 3D-embedding instructions on the web page may include instructions for the browser application to automatically provide the compatibility information to the visualization server 12.

In other cases, the browser application may provide the compatibility information in response to a request from the server 12. For example, a HTML command such as "Accepts Header" or other suitable HTML submission that includes information provided by the browser using could be transmitted by the server 12 to the browser application to inquire about the browser's ability to render 3D data. In another example, a JavaScript command that detects features of the browser application could be executed.

If the browser compatibility information indicates that the browser is not operable to render 3D data, then the server 12 generally will not provide the 3D data to the client computers 16. This prevents unnecessary transmitting of the 3D data to client computers 16 that are not capable of rendering that information. In some embodiments, the server 12 may instead provide two dimensional data (e.g. image data) associated with the object when the browser compatibility information indicates that the browser is not able to render 3D data.

Even if the browser compatibility information indicates that the browser is operable to render 3D data, then the server 12 may be configured to perform additional testing. In particular, the browser compatibility information, while being suggestive of the operability of the client computer 16 to render 3D visualization, is not necessarily indicative of whether the browser application is in fact able to successfully render 3D data. In other words, the browser application may "think" that it can render 3D data but in fact not be able to successfully render the three dimensional data for a plurality of reasons. For example, the browser application may not be able to render the 3D visualization data provided due to insufficient performance capability and/or lack of support for specific features. The server 12 is configured to test the browser application on the client computer 16 to determine whether the browser application can in fact render 3D data.

In some embodiments, the testing of the browser application may include providing a number of rendering functions and/or test 3D data for the browser application to execute and render. The test 3D data may be smaller in size than 3D data associated with various objects. Having a relatively smaller size test data may allow the test data to be transmitted more quickly over the network, and the rendering functions may then be executed on the test 3D data.

The success or failure of the client computer 16 to execute and render test 3D data is monitored and provided to the server 12. If the client computer 16 is able to successfully execute and render the test 3D data, it is more likely that it will be able to test and render the 3D data associated with various objects.

In some embodiments, the ability of a particular client computer 16 to render three dimensional data successfully or unsuccessfully may be recorded. This may prevent the server from having to re-test the client computer 16 for its ability to render 3D data each time 3D data for objects are requested. In some cases, information regarding the ability of the client computer 16 may be stored in a "cookie" file for the browser. In some cases, the server 12 may remember the abilities of the client computers 16 to render 3D data by storing such information on the server. For example, an internet protocol address (IP address) associated with the client computer 16 may be used to remember the ability of the client computer 16 to render 3D data. In other embodiments, various other means may be used to remember one or more of the client computers' ability to render 3D data.

If it is determined that the browser is able to render 3D data, 3D data associated with the object(s) is provided to the browser application on the client computer 16. The browser application will receive and render the 3D data such that the user of the client computers 16 may view the 3D visualization of the object.

In some embodiments, the instructions to render the received 3D data may be provided to the client computer as part of the 3D-embedding instructions. For example, the 3D-embedding instructions may kick off JavaScript or other form of instructions that will initiate rendering the 3D data.

In some embodiments, the rendering may be facilitated by WebGL, which is supported by many modern browsers. The WebGL code may be controlled indirectly, via JavaScript, or via a library or framework (e.g. three.js. In some embodiments, the rendering may be facilitated by a plugin and/or Flash. If the rendering is facilitated in Flash, an interface like PaperVision or Away3D may be used to control the rendering.

Figure 2:
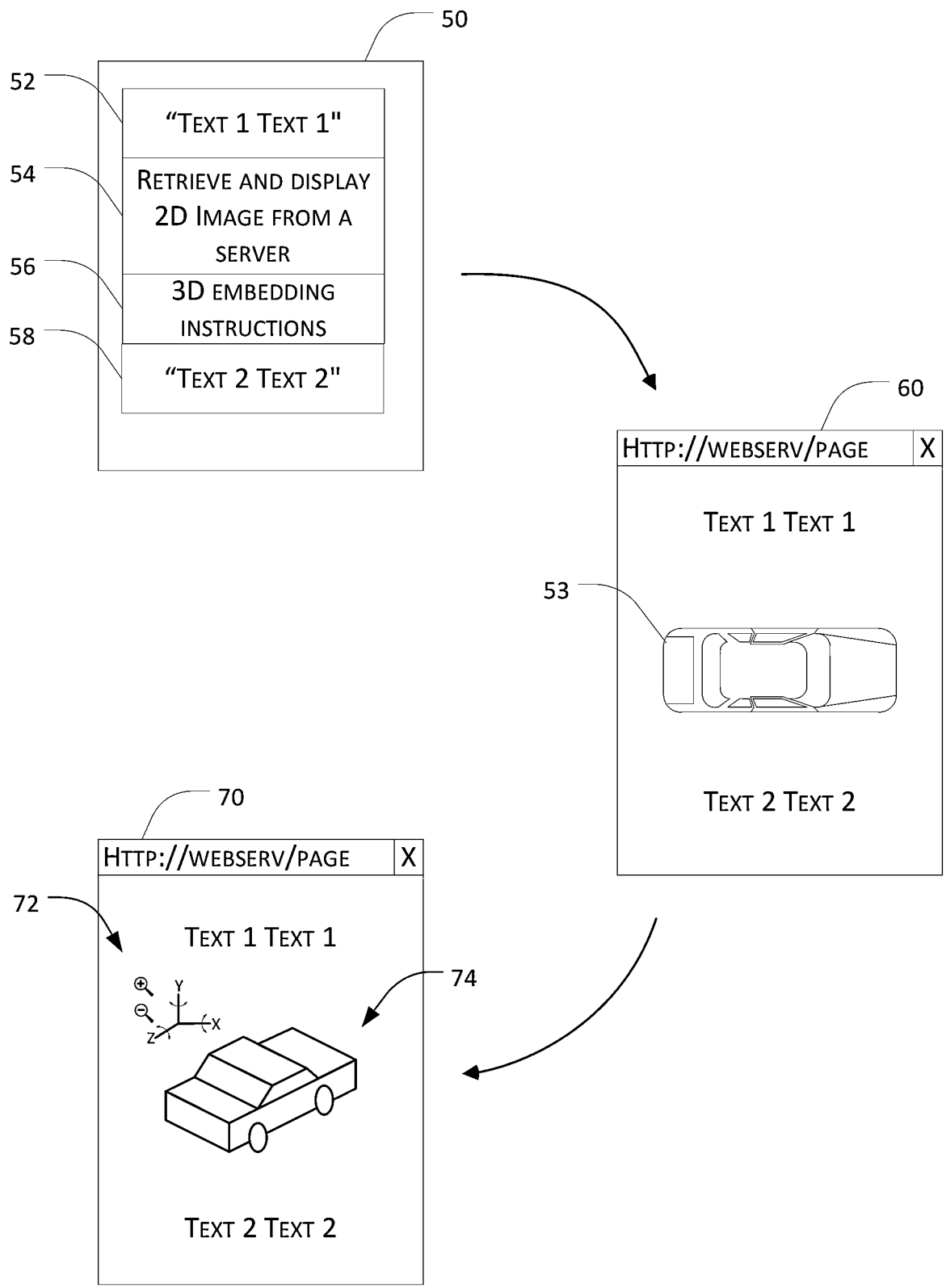
FIG. 2 is a schematic diagram illustrating exemplary instructions that may be provided by the webserver shown in FIG. 1 and webpages that may be rendered by executing such instructions.

Referring now to FIG. 2, illustrated therein is a schematic illustration of instructions provided in a web page and webpages that are rendered when such instructions are executed. The instructions 50 may be provided in a webpage by one of the web servers 18 to one or more of the client computers 16.

As shown, the web page 50 includes instructions 52 to render "Text1 Text1" and instructions 58 to render "Text 2 Text 2". The web page 50 also includes instructions 54 to render a 2D image from a server. In some cases, the 2D image may be provided by the web server 18 or by the visualization server 14. The web page 50 also includes 3D-embedding instructions 56 which are described in further detail below.

The client computers 16 receive the web page 50 and execute the instructions 52, 54, 56, and 58 contained therein. Typically, a web page is executed by the browser applications on the client computer 16.

When the instructions 52, 54, 56 and 58 are executed, a web page 60 may be initially displayed on the display device of the client computer 16. The web page 60, as shown, includes "Text 1 Text 1" from executing instructions 52, a 2D image 53 from executing instructions 54, and "Text 2 Text 2" from executing instructions 58.

The 3D-embedding instructions 56 are also being executed while the rest of the elements of page 60 are being displayed. However, the web page 60 does not initially include any 3D visualizations due to a variety of reasons. For example, as described above, when the 3D-embedding instructions are being executed, the browser may be being tested for its ability to render 3D data. In some cases, the web page 60 may be being displayed while the client computer 16 is waiting for 3D visualization data to be transmitted. In some cases, the web page 60 may be displayed because there is no 3D visualization data available or if the browser is unable to render the 3D visualization data.

As described above, executing the 3D embedding instructions would send a request to the visualization server 12 for 3D visualization data. The visualization server 12 may then determine whether there is corresponding 3D visualization data and test whether the browser requesting the 3D visualization data is operable to render the 3D visualization data as described above. In cases where the 3D visualization data is available and the testing is successful, the 3D visualization data is transmitted to the client computer for rendering. The client computer then receives the 3D data and renders it, for example, as shown in web page 70 which had replaced the 2D image 53 with the 3D visualization 74. The user may then interact with the 3D controls 72 to view the visualization 74.

Generally, the transition between the web page 60 and 70 may be configured to provide a smooth and pleasing user experience. For example, the image 53 may be replaced with the 3D visualization 72 without needing to refresh the web page. In another example, the 3D visualization 72 may be added to the web page 60. That is, the 3D visualization 72 may not replace the 2D image 53.

Providing the web page 60 while attempting to retrieve and render 3D data may provide a better user experience as the user need not wait for the 3D data to render before starting to view the content provided on the web page 60. Furthermore, in cases where there are no 3D visualization data available or where the client computer 16 is unable to render the 3D visualization data, the system provides a graceful degradation in that the user can continue to view the content on the web page 60. That is, the user is not affected by the lack of 3D rendering or by testing whether the client computer 16 can render the 3D visualization data.

In some embodiments, the 3D-embedding instructions may be relatively easy to implement (e.g. a single of code) to include in the web page. This allows web page developers to design web pages that can incorporate 3D visualizations without spending much effort. Existing web pages could be "retrofitted" with 3D renderings by adding the 3D-embedding instructions for desired objects at desired locations. This prevents developers from having to develop web pages from scratch to include 3D visualizations.

Figure 3:
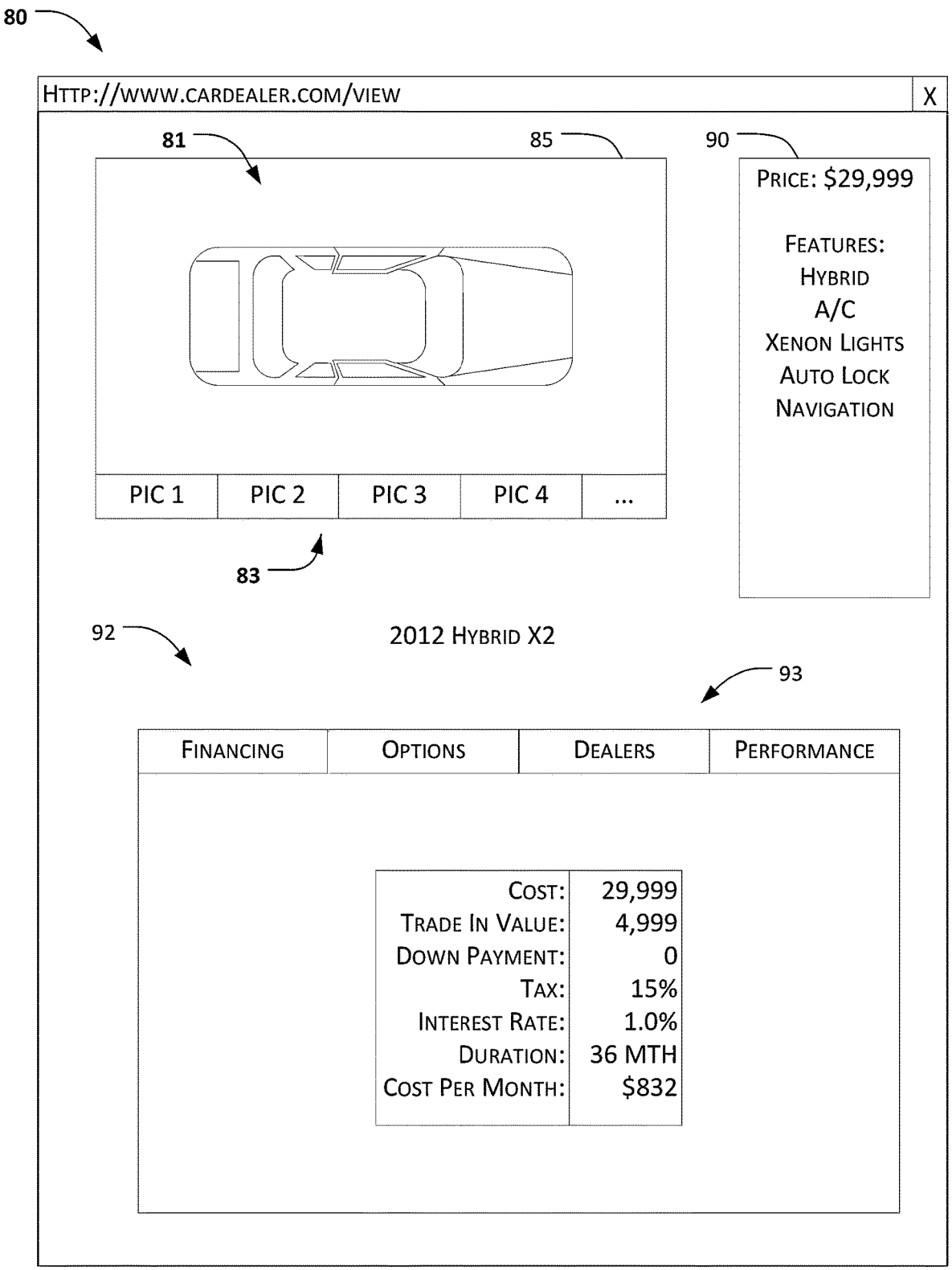
FIG. 3 is a schematic diagram illustrating an exemplary webpage that may be provided by the webserver shown in FIG. 1.

Referring now to FIG. 3, illustrated therein is an exemplary webpage 80 that may be received from the web server 18 and rendered by the client computers 16. The web page 80 provides information about a car in a number of formats. The web page 80 includes an image gallery 81 that provides a number of images 83 of the car, namely "Pic 1", "Pic 2", "Pic 3", and "Pic 4" and so on. The selected image (Pic 1), which is a top view of the car, is displayed in a larger size in a window 85. Users may click on other images 83 to display the images in a larger size in the window 85.

The web site also includes information areas 90 and 92 that provide additional information related to the car. Provided information may include financing information, various options that are available, dealers where the care may be purchased from, performance information and so on. The user viewing the web page 80 may click on the tabs 93 to access various information that are provided in the web page. As shown, financing information is being provided in the information area 92.

Figure 4:
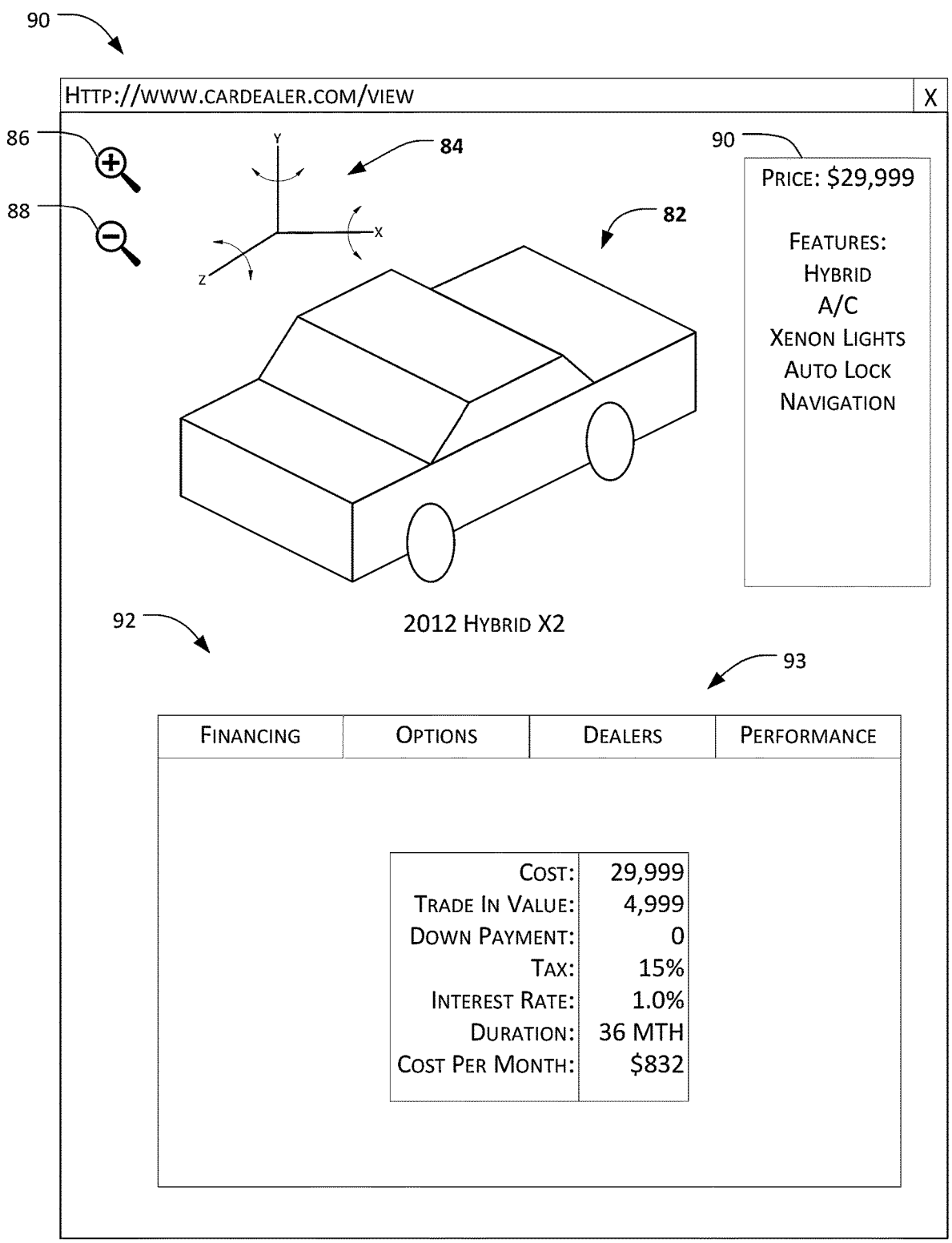
FIG. 4 is a schematic diagram illustrating an exemplary webpage that includes 3D visualization provided by the visualization server shown in FIG. 1.

Generally, the web page 80 may be provided when there is no 3D data associated with the car available, when the client computer 16 is unable to render the three dimensional data, while the client computer 16 is being tested for its ability to render 3D data or while the 3D data is being transmitted. In cases, where there is 3D data available and the client computer 16 is able to render that data, a web page 90 as shown in FIG. 4 may be provided.

Figure 5:
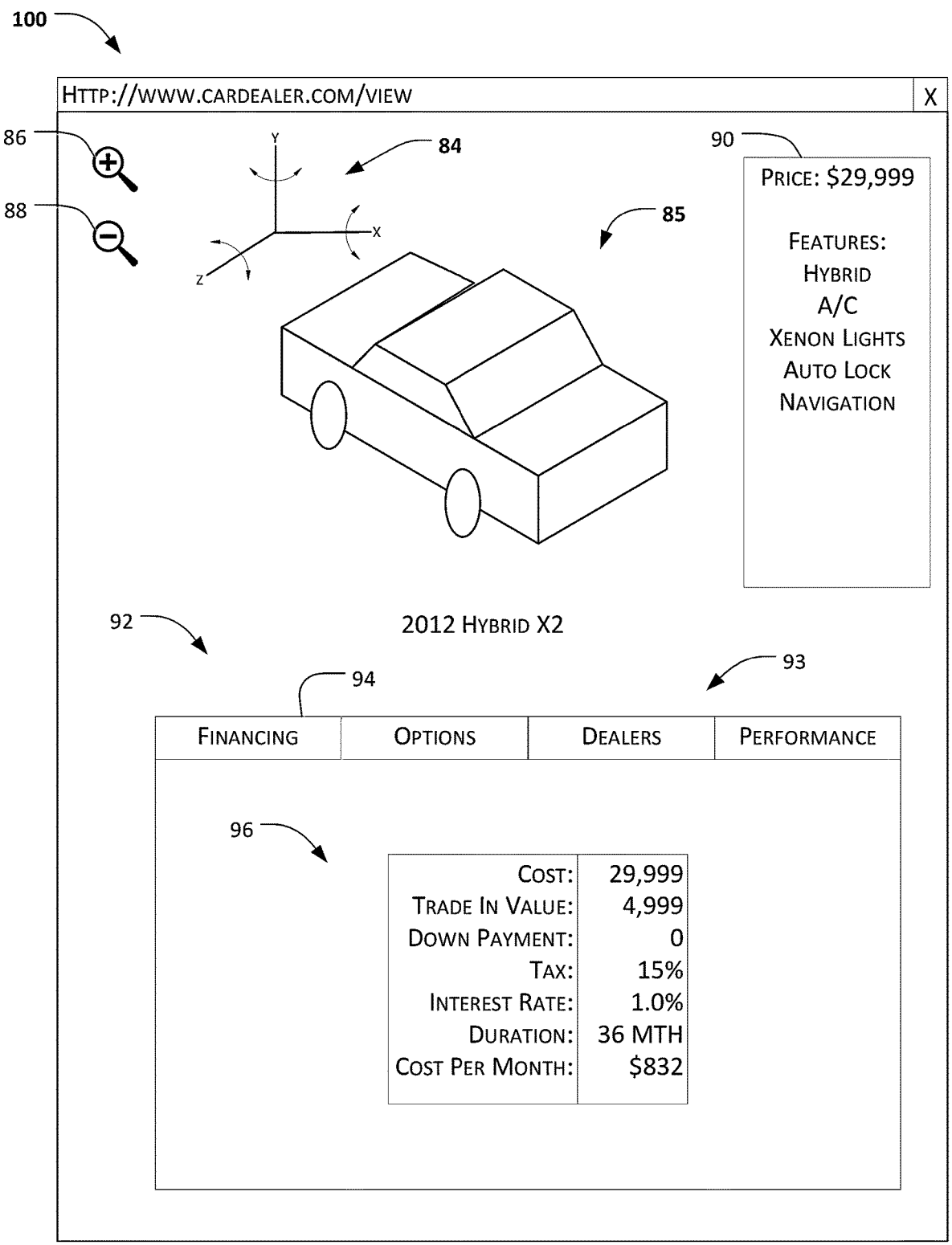
FIG. 5 is a schematic diagram illustrating the webpage shown in FIG. 4 with the 3D visualization being manipulated to show a different viewpoint of the object.
Figure 6:
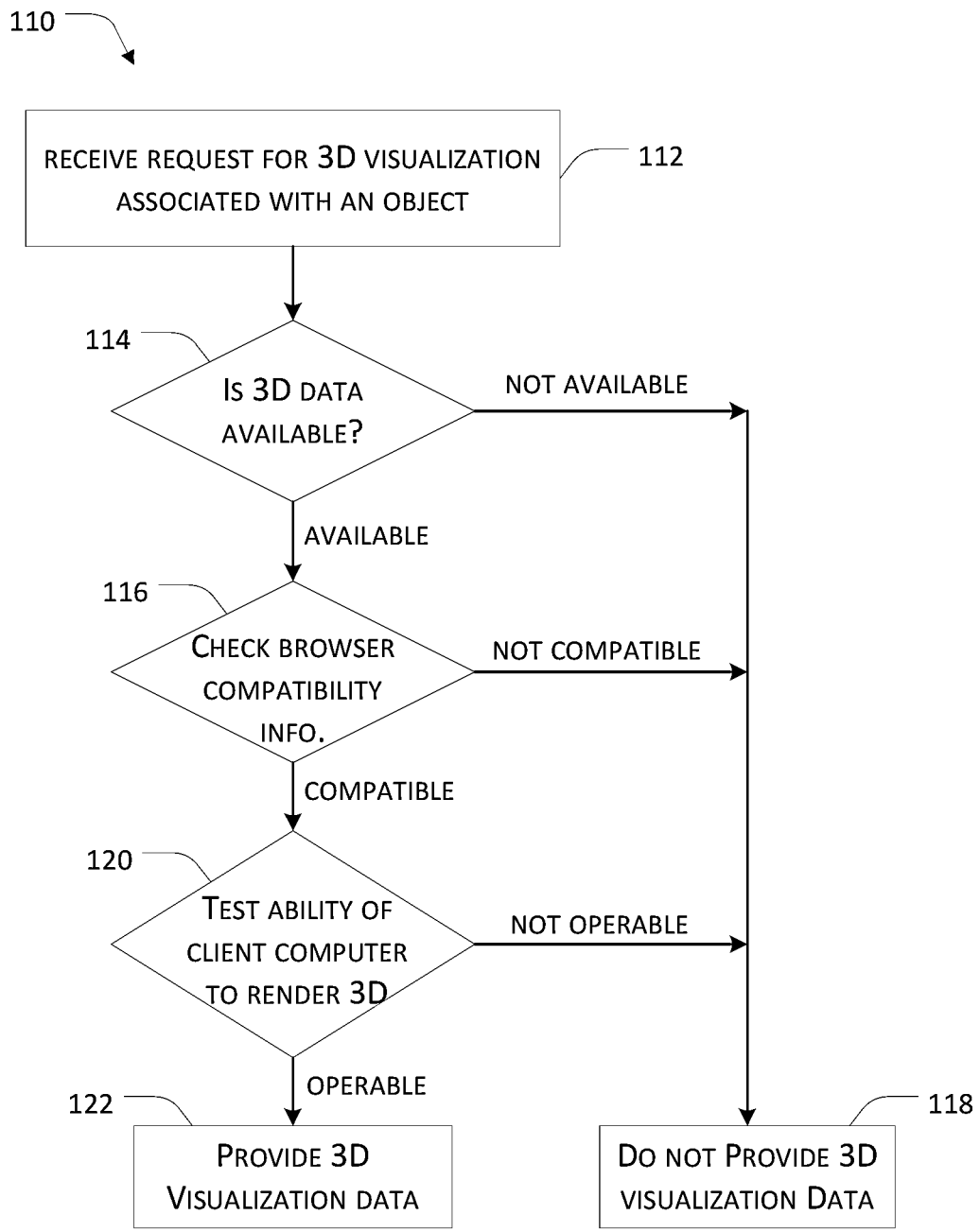
FIG. 6 is a flow chart illustrating exemplary steps of a method for transmitting a 3D visualization of at least one object according to some embodiments.

The web page 90 does not include the image gallery 81 shown in the web page 80. In place of the image gallery 81, a three dimensional rendering 82 of the car is displayed. The web page 90 also indicates "x", "y", and "z" axis of rotation as indicated by reference numeral 84. Moving the mouse or other control device (including gesture recognition on a touch screen) over the rendering 82 about various axes 84 would rotate the rendering 82 of the car. FIG. 5 illustrates a rendering 85 of the car when it has been rotated about the axes 84. In some embodiments, clicking and moving the mouse in the direction of various axes 84 may correspondingly rotate the model 82.

The web pages 90, 100 as shown also include controls 86 and 88 to zoom in and zoom out of the rendering 85. Manipulating the controls 86 or 88, for example, by clicking on them allows the user to zoom in to view a particular part of the visualization that is of interest or to zoom out to provide a larger picture.

Generally, the interface to manipulate the 3D visualization should be intuitive to the users such that user training is unnecessary. That is, the users need not have detailed knowledge of 3D visualizations to manipulate the 3D visualizations that are rendered. Nevertheless, instructions on how to manipulate the 3D rendering may be provided in some embodiments, For example, if the user leaves the mouse over a selected area (e.g. area of the rendering) for a predefined period of time, then web page may display manipulation instructions in a pop-up text box.

In some embodiments, the camera or view angle may be fixed look at the product regardless of the user control.

In some embodiments, the movement of the rendering relative to the movement of the control device may not be in direct proportion. That is, moving the mouse over a large area may not necessarily translate to proportionate rotation of the visualization rendering. The rendering function may employ an easing function of function like the following code to rotate the visualization at a suitable pace.

Referring to FIG. 4, illustrated therein is a method for 110 for transmitting a visualization of at least one object. The method 110 may be executed by a server that provides 3D visualizations of objects such as the server 12 shown in FIG. 1 and described herein above.

The method beings at step 112 wherein at least one request for the at least one 3D visualization associated with the at least one object from at least one client computer is received.

At step 114, it is determined whether 3D visualization data associated with the at least one object is available. If the 3D visualization data is available, the method proceeds to step 116. If the 3D visualization data is not available, the method proceeds to step 118 where no 3D visualization data is provided.

At step 116, it is determined whether the at least one client computer is operable to render the at least one 3D visualization based upon the compatibility information provided by the at least one client computer. If the compatibility information indicates that the client computer is able to render the 3D visualization, the method 110 proceeds to step 120. If the compatibility information indicates that the client computer is not able to render the 3D visualization, then method 110 proceeds to step 118.

At step 120, it is determined whether the at least one client computer is operable to render the at least one 3D visualization based by testing the at least one client computer. The client computer may be tested, for example, providing test 3D data and/or executing a number of rendering functions. If it is determined that the client computer is able to render the 3D visualization data, the method proceeds to step 122 where the 3D visualization data is provided. If it is determined that the client computer is unable to render the 3D visualization data, the method proceed to step 118 where no 3D visualization data is provided.

Exemplary, computer readable instructions to execute one or more of the above described features are provided in Appendix "A" attached hereto. While the above description provides examples of one or more apparatus, systems and methods, it will be appreciated that other apparatus, systems and methods may be within the scope of the present description as interpreted by one of skill in the art.

Appendix "A"

In some embodiments, the following computer readable instructions may be executed to detect a browser application's ability to provide an available canvas and to get a "webgl" or "experimental-webgl" context to determine the browser's compatibility information which may be indicative of whether the browser is capable of rendering 3d visualization data.
Code:
```
window.WellGL=(function(namespace){
    var WellGL=namespace!==undefined?namespace:{ };
    WellGL.hasCanvas=!!window.CanvasRenderingContext2D;
    WellGL.hasContexts=[ ];
    WellGL.hasWebGL=(function(_this){
    var canvas=_this.hasCanvas &&
document.createElement("canvas"),
        contexts=["webgl", "experimental-webgl" ];
        for (var i=0; i<contexts.length; i++){
            try {
                gl=canvas.getContext(contexts[i]);
                if (gl) {
                    _this.hasContexts.push(contexts[i]);
                    break;
                }
            } catch(e){
                return;
            }
            if (gl==undefined){
                return;
            }
        }
    return_this.hasCanvas;
    })(WellGL);
    return WellGL;
})(window.WellGL);
```
In some embodiments, the following computer readable instructions may be executed to confirm that a browser application is capable of rendering 3D visualization data by monitoring the rendered pixels and comparing the rendered pixels to an expected result (defined as an array in expectedOutput.js in our case). This function could be employed to detect if the client computer supports various features such as textures, lighting, anti-aliasing, and so on. For e.g. different sections of the pixels may monitored by configuring the _width, _height, _startX, and _startY parameters.
```
function testReadPixels( ){
    // _preserveDrawingBuffer=true must be set in THREE.
WebGLRenderer for Chrome to use readPixels
    _gl=renderer.context,
    _width=width, // bounding box
    _height=10, // for the section
    _startX=0, // of pixels we
    startY=170, // want to test
    buffer=new    ArrayBuffer(_width*_height*4),    //buffer
        length in bytes; 4 bytes for RGBA
    outputArray=new Uint8Array(buffer)
    missed=0;
    try {
    _gl.readPixelsLstartX, _startY, _width-1, _height-1,
        _gl.RGBA, _gl.UNSIGNED_BYTE, outputArray);
    } catch(e) {
    //console.log('readPixels fail', e);
    }
    // loop through the arrays and count the bytes that don't
match
    var countMisses=function(a1, a2) {
    if (a1.length !==a2.length) return null;
    var length=a1.length,
        i=0,
        misses=0;
    for (; i<length; i++) {
        a1[i] !==a2[i] && misses++;
    }
    return misses;
    };
    missed=countMisses(outputArray, expectedOutput);
    //console.log('missed', missed, 'out of', expectedOutput.ength);
}
```
In some embodiments, the following computer readable instructions could be executed to determine whether the 3D model will be rendered on a client's browser application with a reasonably high frame rate (FPS) so as to give a good user experience.
Code:
```
var benchmark=true, // flag to run the benchmark test
    targetFPS=40,
    averageFPS=0,
    benchmarkPassed=false,
    testDuration=7, // in seconds, converting to milliseconds
in setTimeout call
    frameCount=0,
    timeoutID=null,
    onTestStart=function( ){
    console.log('benchmark started');
    },
    onTestComplete=function( ){
    averageFPS=Math.ceil(frameCount/testDuration); // let's
        be generous and round up
    benchmarkPassed=averageFPS>=targetFPS;
    console.log('benchmark complete');
    console.log(['frameCount', frameCount]);
    console.log(['averageFPS', averageFPS]);
    console.log(['targetFPS', targetFPS]);
```

```
    console.log(['assert  averageFPS>=targetFPS',  bench-
        markPassed]);
    }
function animate( ){
    requestAnimationFrame(animate);
    render( );
    stats.update( );
    if (benchmark) {
    if(
        timeoutID===null
        &&
        mesh!==null
    ){
        onTestStart( );
        timeoutID=window.setTimeout(
            function( ){
                benchmark=false; // benchmark is complete, don't
                    run again
                timeoutID=null; // reset the timeoutID
                onTestComplete; // run the callback function
            },
            testDuration*1000 // testDuration is in seconds, need
                ms
        );
    }
    frameCount++;
    }
}
```

In some embodiments, the following computer readable instructions could be executed to store available context information in a cookie named "WellGL". If a browser is not capable of creating a "webgl" or "experimental-webgl" context the value "NO" is stored and the server can then ignore requests for 3d models or optionally return 2d images. This could be used to "remember" the results of the tests

```
    if (WellGL.hasWebGL){
    createCookie("WellGL",  WellGL.hasContexts.join("_"),
        365);
    } else {
    createCookie("WellGL", "NO", 365);
    return;
    }
```

In some embodiments, the following computer readable instructions could be executed to determine if a client has 3D rendering capability based upon the cookie information received by the server. For example, if a client makes a request to a URL with the parameter upc=1234567890 and sends a cookie with a Key:Value=WellGL:webgl they will get redirected to the 3d model of a shampoo bottle in this example, located at a relative URL "/3d/shampoo.js"

```
<?php
$productsByUPC=array(
    "1234567890"=>"/3d/shampoo.js"
);
if(
    isset($_COOKIE["WellGL"])
    && $_COOKIE["WellGL"]"NO"
)}
    if(
    isset($_GET["upc" ])
    && isset($productsByUPC[$_GET["upc"]])
    )}
    header("Location:".$productsByUPC[$_GET["upc"]]);
    }
}
?>
```

In some embodiments, the following computer readable instructions may be executed to load JavaScripts for testing the browser's ability to render 3D data.

```
<script type="text/javascript">
(function( ){
    var             wgls=document.createElement('script');
    wgls.type='text/javascript';
    wgls.async=true; wgls.src='//3d.vm.well.ca/js/WelGL.js';
    var s=document.getElementsByTagName('script')[0];
    s.parentNode.insertBefore(wgls, s);
}) ( );
</script>
```

In some embodiments, the following computer readable instructions may be executed to replace a 2D image of a shampoo bottle can be replaced with a 3d visualization of the same product (with UPC code 1234567890 for example). Eventhough the styling is shown in CSS for this example, a similar effect could be achieved using JavaScript. A "DIV" element with id="threedee" is provided as a placeholder where 3D visualization data will be rendered within the HTML document.

The JavaScript object "_wglc" has a required field "filename" which instructs the server which 3D model is required in this document. The field's background, width, and height are optional parameters which can be used to customize the size of the 3d model and background-color to match the 2D image it is replacing.

```
<style>
    .testing {
    position: fixed;
    left: -1000 px;
    }
    canvas{
    position: absolute;
    visibility: hidden;
    }
    .loaded canvas {
    visibility: visible;
    }
</style>
<div id="threedee">
    <!-- add class="testing" to move this div off the screen
while testing -->
</div>
<img src="/images/shampoo.png"/>
<script type="text/javascript">
// optional custom configuration
_wglc={
    background: 0xffffff,
    width: 500,
    height: 650,
    filename:                         '//3d.vm.well.ca/3d/
get3d.php?upc=1234567890'
};
(function( ){
    var             wgls=document.createElement('script');
    wgls.type='text/javascript';
    wgls.async=true; wgls.src='//3d.vm.well.ca/js/WelGL.js';
    var s=document.getElementsByTagName('script')[0];
    s.parentNode.insertBefore(wgls,s);
}) ( );
</script>
```

The invention claimed is:

1. A system for transmitting and rendering a visualization of at least one object, the system comprising:
   (a) at least one web server having access to at least one web page, the at least one web page including three-dimensional embedding ("3D embedding") instructions for requesting at least one 3D visualization associated with at least one object;

(b) at least one client computer in data communication with the at least one web server, the at least one client computer configured to:
receive the at least one web page and
execute the 3D embedding instructions included therein to send a request for the at least one 3D visualization associated with the at least one object;

(c) at least one visualization server in data communication with the at least one client computer, the at least one visualization server configured to:
receive the request for the at least one 3D visualization associated with the at least one object;
determine whether or not the at least one visualization server has access to 3D visualization data associated with the at least one object for rendering the at least one 3D visualization associated therewith;
verify that the at least one client computer is compatible with the at least one 3D visualization based on compatibility information provided by the at least one client computer;
transmit test 3D data and one or more rendering functions to the at least one client computer, the test 3D data being smaller in size than the 3D visualization data, wherein the transmitted one or more rendering functions include an easing function to render the test 3D data;
determine a performance capability of the at least one client computer to render the 3D visualization data based on execution of at least the easing function on the test 3D data on the at least one client computer; and
determine whether or not to provide the 3D visualization data to the at least one client computer based upon whether the at least one visualization server has access to the 3D visualization data, whether the client computer is compatible with the at least one 3D visualization, and whether the at least one client computer has the performance capability to render the 3D visualization data.

2. The system of claim 1, wherein the at least one visualization server is configured to obtain the compatibility information from the at least one client computer by sending at least one request for compatibility information to a web-browser application on the at least one client computer.

3. The system of claim 2, wherein the at least one request for compatibility information comprises at least one of a HTML command and a javascript command.

4. The system of claim 1, wherein the test 3D data is provided to the at least one client computer to test whether a video card of the at least one client computer can support Open GL.

5. The system of claim 1, wherein at least one of the at least one visualization server and the at least one client computer is configured to store information regarding the operability of the at least one client computer to render the 3D visualization.

6. The system of claim 1, wherein the at least one client computer is configured to:
(a) display at least one 2D image associated with the at least one object within the at least one web page when the 3D visualization data has not been received from the at least one visualization server, and (b) replace the at least one 2D image with the at least one 3D visualization if the 3D visualization data is received from the 3D visualization server.

7. The system of claim 1, further comprising a 3D visualization data generator for generating the 3D visualization data associated with the at least one object.

8. The system of claim 1, wherein the 3D visualization data is associated with the at least one object is associated an identifier, the identifier being associated with the same at least one object, and the 3D-embedding instructions include the identifier.

9. The system of claim 1, wherein, to obtain the test pixel data indicative of the rendering of the test 3D data at the at least one client computer, the at least one visualization server is configured to: transmit the test 3D data to the at least one client computer to render the test 3D data and receive the test pixel data from the at least one client computer after the at least one client computer has attempted to render the test 3D data.

10. The system of claim 5, wherein:
the at least one visualization server is configured to store information regarding the operability of the at least one client computer to render the 3D visualization and,
to obtain the test pixel data indicative of the rendering of the test 3D data at the at least one client computer, the at least on visualization server is configured to retrieve the information previously stored on the at least one visualization server regarding the operability of the at least one client computer to render the 3D visualization.

11. A method for transmitting a visualization of at least one object comprising:
(a) receiving at least one request for at least one 3D visualization associated with the at least one object from at least one client computer;
(b) determining whether or not 3D visualization data associated with the at least one object is available;
(c) verifying that the at least one client computer is compatible with the at least one 3D visualization based on compatibility information provided by the client computer;
(d) transmitting test 3D data and one or more rendering functions to the at least one client computer, the test 3D data being smaller in size than the 3D visualization data, wherein the transmitted one or more rendering functions include an easing function to render the test 3D data;
(e) determining a performance capability of the at least one client computer to render the 3D visualization data based on execution of at least the easing function on the test 3D data on the at least one client computer; and
(f) determining whether or not to provide the 3D visualization data to the at least one client computer based upon the availability of the 3D visualization data, whether the at least one client computer is compatible with the at least one 3D visualization, and whether the at least one client computer has the performance capability to render the 3D visualization data.

12. The method of claim 11, further comprising obtaining the compatibility information by sending at least one request for compatibility information to a web-browser application on the at least one client computer.

13. The method of claim 11, further comprising
(a) displaying, at the at least one client computer, at least one 2D image associated with the at least one object within the at least one web page when the 3D visualization data has not been received, and (b) replacing the at least one 2D image with the at least one 3D visualization if the 3D visualization data is received at the at least one client computer.

14. The method of claim 11, wherein the obtaining the test pixel data indicative of the rendering of the test 3D data at the at least one client computer comprises transmitting the test 3D data to the at least one client computer to render the test 3D data and receiving the test pixel data from the at least one client computer after the at least one client computer has attempted to render the test 3D data.

15. The method of claim 11, further comprising storing information regarding the operability of the at least one client computer to render the 3D visualization.

16. The method of claim 15, wherein the obtaining the test pixel data indicative of the successful rendering of the test 3D data at the at least one client computer comprises retrieving the information previously stored on the at least one visualization server regarding the operability of the at least one client computer to render the 3D visualization.

17. A server for transmitting a visualization of at least one object comprising:
(a) at least one data storage device for storing 3D visualization data associated with a plurality of objects;
(b) at least one processor operably coupled to the at least one data storage device, the at least one processor configured to:
  (i) receive at least one request for the at least one 3D visualization associated with at least one object from at least one client computer;
  (ii) determine whether or not the 3D visualization data associated with the at least one object is available in the at least one data storage device;
  (iii) verify that the at least one client computer is compatible with the at least one 3D visualization based on compatibility information provided by the client computer;
  (iv) transmit test 3D data and one or more rendering functions to the at least one client computer, the test 3D data being smaller in size than the 3D visualization data, wherein the transmitted one or more rendering functions include an easing function to render the test 3D data;
  (v) determine a performance capability of the at least one client computer to render the 3D visualization data based on execution of at least the easing function on the test 3D data on the at least one client computer; and
  (vi) determine whether or not to provide the 3D visualization data to the at least one client computer based upon the availability of the 3D visualization data, the compatibility of the client computer, and the performance capability of the at least one computer to render the 3D visualization data.

18. The server of claim 17, wherein the at least one processor is configured to:
(a) display, at the at least one client computer, at least one 2D image associated with the at least one object within the at least one web page when the 3D visualization data have not been received, and
(b) replace the at least one 2D image with the at least one 3D visualization if the 3D visualization data is received at the at least one client computer.

* * * * *